Patented Dec. 29, 1936

2,066,117

UNITED STATES PATENT OFFICE 2,066,117

IMPREGNATED ARTICLE

Evart E. Mayfield, Wilmington, Del., assignor to Hercules Powder Company, Wilmington, Del., a corporation of Delaware No Drawing. Application October 9, 1934, Serial No. 747,563

7 Claims. (Cl. 91—68)

This invention relates to an improvement in impregnated articles. More particularly, the invention finds an especially advantageous embodiment in box toes for shoes.

Heretofore impregnated articles comprising an absorptive base, such as a felt, woven fabric, or the like, impregnated with a composition comprising essentially chlorinated rubber and a resin, and where desired also a plasticizer and/or other desired ingredients, has been suggested. In the production of such articles it has been customary to pass the base in sheet form through a bath of the impregnating composition dissolved in a suitable solvent, the base being led from the bath to a drier. While such impregnated articles have been desirable, it has been found that the chlorinated rubber of the impregnating composition becomes very tacky and resembles an adhesive when the solvent is partially removed from the composition and that as a result the impregnated base sticks to every part of the drier with which it comes in contact, as rolls, etc., and great difficulty is encountered in breaking it loose.

Now in accordance with this invention, it has been found that impregnated articles comprising a base impregnated with a composition including chlorinated rubber and having all the advantages of the impregnated articles, including chlorinated rubber, heretofore referred to, but free from the disadvantage arising from tackiness of the chlorinated rubber in the drying step, may be produced by the inclusion in the impregnating composition of paraffin.

Impregnated articles in accordance with this invention will comprise a base, which will be absorptive and which may be any absorptive material, as, for example, a felt, a woven fabric, or the like, impregnated with a composition comprising essentially chlorinated rubber, a resin and paraffin and with which may be included a plasticizer and/or other ingredients which may be desirable for the ultimate purpose for which the article is intended.

In producing impregnated articles in accordance with this invention, the base, in sheet form, will be passed through a bath comprising chlorinated rubber, a resin and paraffin and a solvent, with or without the inclusion of a plasticizer and such other ingredients as may be desired, the base being led from the impregnating bath to a drier of any desired suitable structure and in which the solvent will be evaporated under suitable temperature conditions.

The chlorinated rubber forming an ingredient of the impregnated composition may be of any suitable or desired type produced by any well known or desired procedure involving the chlorination of vulcanized, unvulcanized or reclaimed rubber, latex, gutta percha, balata, and the like. It may vary widely in chlorine content and may be of widely varying viscosity. Merely by way of illustration, the chlorinated rubber may, for example, have a chlorine content of 40-75%. Its viscosity may be, for example, 30-1000 centipoises in 20% solution in toluol. The chlorinated rubber may be present in the impregnating composition in widely varying amount.

Merely by way of example, the impregnating composition may contain 10-90% of chlorinated rubber by weight of the non-volatile ingredient. The resin may be any of the usual natural or synthetic resins, for example, rosin, dammar gum, ester gum, nevendine gum, vinylite resin, amberol resin, or the like, or mixtures thereof. Variously the resins, as rosin and ester gum, may be hydrogenated. The resin may be used in widely varying amount, say, for example, in amount within about the range 10-70% by weight of the non-volatile portion of the composition.

The paraffin may be any paraffin. By way of illustration for example, the paraffin may be a mixture of paraffin hydrocarbons melting within about the range 40-80° C. Preferably, the paraffin will be a mixture of paraffin hydrocarbons melting within about the range 50-60° C. The paraffin may be used in varying amount, but for illustration will be found efficient when used in amount, for example, within about the range 1-10% by weight of the non-volatile portion of the composition. Preferably, though not necessarily, the paraffin will be used in amount within the range about 3-6% by weight of the non-volatile portion of the composition.

Where a plasticizer is used, such may be any suitable plasticizer as, for example, castor oil, dibutyl phthalate, tricresyl phosphate, ethyl and methyl abietates, hydrogenated ethyl and methyl abietates, pine oil foots, cumarone, soft resin, melting point 0-25° C., polymerized terpenes, etc. The plasticizer may be used in widely varying proportion and, for example, may be used in amount within about the range 1-25% by weight of the non-volatile portion of the composition.

Any other desired ingredients may be included in the composition, other particular ingredients being included as may be dictated by the desired characteristics of the ultimate impregnated article to be produced.

Various solvents, or solvent mixtures, for the composition may be used. Thus, by way of illustration, for example, the solvent may comprise ethylene dichloride, ethyl acetate, benzol, toluol, carbon tetrachloride, carbon disulphide, or mixtures thereof. Generally speaking, any low boiling solvent for chlorinated rubber and for such other ingredients as are included in any given composition may be used. The solvent may be used in widely varying amounts, depending upon the viscosity of the solution necessary for the proper impregnation of any given base material. By way of illustration, the solvent may be in amount within about the range 35–70% by weight of the solution.

By way of illustration of impregnated articles in accordance with this invention, for example, a suitable base, as, for example, a felt, may be impregnated with a composition made up on any one of the following formulae:

|  | 1 | 2 | 3 | 4 | 5 | 6 | 7 | 8 | 9 |
|---|---|---|---|---|---|---|---|---|---|
| Chlorinated rubber | 40 | 40 | 40 | 40 | 40 | 40 | 40 | 40 | 40 |
| Rosin | 160 | 160 | 160 | 160 | 160 | 160 | 160 | 160 | 160 |
| Soft cumarone | 20 | 30 | 40 | 20 | 20 | 20 | 20 | -- | -- |
| Pine oil foots | -- | -- | -- | -- | -- | -- | -- | -- | 20 |
| Dibutyl phthalate | -- | -- | -- | 10 | -- | -- | -- | -- | -- |
| Butyl stearate | -- | -- | -- | -- | 10 | -- | 20 | -- | -- |
| Tricresyl phosphate | -- | -- | -- | -- | -- | 10 | -- | -- | -- |
| Benzol | 160 | 160 | 160 | 160 | 160 | 160 | 160 | 160 | 160 |
| Paraffin | 10 | 10 | 10 | 10 | 10 | 10 | 10 | 10 | 10 |

Any desired chlorinated rubber may be used in making up the above formulae. However, for the purpose of illustration, the above formulae will be productive of satisfactory compositions where a chlorinated rubber containing about 66% chlorine and of a viscosity of about 130 centipoises at 25° C. in 20% solution in toluol is used.

In effecting impregnation of the base using impregnating compositions made up on any one of the above formulae, as has been indicated, the base will be passed through a bath of the composition and thoroughly saturated therewith. The saturated base will then be passed through any suitable form of drier and the solvent removed from the composition. In removing the solvent, as for example, by evaporation, it will be desirable, due to the presence of the paraffin, to evaporate the solvent at a temperature at least as high as the melting point of the wax. Preferably, though not necessarily, the drying will be effected in a current of air at a temperature say within about the range 200–230° F.

Impregnated articles in accordance with this invention may have various forms and will be characterized by a light color, if a light colored base material is used, by toughness and strength, by freedom from spontaneous oxidation on storage and from dusting out of the impregnating composition.

In the production of box toes for shoes in accordance with this invention, suitable blanks for the formation of box toes, are saturated with, for example, a composition in accordance with one or another of the above formulae, partially dried, lasted into a shoe and then finally dried. Alternatively, the box toe blanks may be cut from an impregnated sheet after drying, and lasted after softening the sheet by the application of solvent thereto, with final elimination of the solvent. Again, since the impregnating compositions have thermoplastic properties, box toes, or other articles, may be formed from blanks cut from an impregnated sheet, the blanks having been softened by the application of heat.

The impregnated articles in accordance with this invention will be found to be free from the disadvantage noted with respect to articles heretofore impregnated with chlorinated rubber compositions in that the chlorinated rubber will not become too tacky during drying as a result of the presence of paraffin.

It will be understood that it is not contemplated that the scope of this invention shall be in any way limited by the specific description and examples of the invention given above. It will be understood that articles of any form, including sheets impregnated with a composition including as essential ingredients chlorinated rubber, a resin and paraffin in any proportions and with the inclusion, if desired, of a plasticizer and other ingredients are contemplated within the scope of this invention. It will be further understood that it is contemplated that the invention will find specific advantageous embodiment in box toes for shoes.

What I claim and desire to protect by Letters Patent is:

1. Box toes for shoes comprising an absorptive base impregnated with a composition including chlorinated rubber, a resin and paraffin.

2. Box toes for shoes comprising an absorptive base impregnated with a composition including chlorinated rubber, a resin and paraffin in amount of about 1% to about 10% by weight of the non-volatile portion of the composition.

3. Box toes for shoes comprising an absorptive base impregnated with a composition including chlorinated rubber, a resin, a plasticizer and paraffin.

4. Box toes for shoes comprising an absorptive base impregnated with a composition including chlorinated rubber, a resin, a plasticizer and paraffin in amount of about 1% to about 10% by weight of the non-volatile portion of the composition.

5. Box toes for shoes comprising an absorptive base impregnated with a composition including chlorinated rubber, a resin and paraffin in amount of about 3% to about 6% by weight of the non-volatile portion of the composition.

6. Box toes for shoes comprising an absorptive base impregnated with a composition including chlorinated rubber, a resin, pine oil foots, and paraffin.

7. Box toes for shoes comprising an absorptive base impregnated with a composition including chlorinated rubber, rosin and paraffin.

EVART E. MAYFIELD.